(12) United States Patent
Kao et al.

(10) Patent No.: US 12,116,808 B2
(45) Date of Patent: Oct. 15, 2024

(54) SECURITY APPARATUS FOR PORTABLE ELECTRONIC DEVICE

(71) Applicant: ACCO Brands Corporation, Lake Zurich, IL (US)

(72) Inventors: James Kao, Fremont, CA (US); Alex J. Klinkman, Campbell, CA (US); Joseph A. Teresi, San Mateo, CA (US); Wilson Tse, Burnaby (CA); Mike Otsuka, Sunnyvale, CA (US); William De Meulenaere, Newark, CA (US)

(73) Assignee: ACCO Brands Corporation, Lake Zurich, IL (US)

( * ) Notice: Subject to any disclaimer, the term of this patent is extended or adjusted under 35 U.S.C. 154(b) by 0 days.

(21) Appl. No.: 18/142,932

(22) Filed: May 3, 2023

(65) Prior Publication Data

US 2024/0003168 A1    Jan. 4, 2024

Related U.S. Application Data

(63) Continuation of application No. 17/962,725, filed on Oct. 10, 2022, now Pat. No. 11,680,429, which is a
(Continued)

(51) Int. Cl.
    *E05B 73/00*    (2006.01)
    *G06F 1/16*     (2006.01)

(52) U.S. Cl.
    CPC ...... *E05B 73/0082* (2013.01); *E05B 73/0005* (2013.01); *G06F 1/1616* (2013.01); *G06F 1/1656* (2013.01)

(58) Field of Classification Search
    CPC ..... Y10T 70/40; Y10T 70/50; Y10T 70/5009; E05B 73/00; E05B 73/0082; E05B 73/0005; G06F 1/1616; G06F 1/1656
(Continued)

(56) References Cited

U.S. PATENT DOCUMENTS

| 1,907,625 A | 5/1933 | Vogt |
| 5,913,907 A | 6/1999 | Lee |

(Continued)

FOREIGN PATENT DOCUMENTS

| CN | 101014751 A | 8/2007 |
| CN | 101131059 A | 2/2008 |

(Continued)

OTHER PUBLICATIONS

Australian Patent Office Examination Report No. 1 for Application No. 2017223387 dated Aug. 3, 2021 (4 pages).
(Continued)

*Primary Examiner* — Suzanne L Barrett
(74) *Attorney, Agent, or Firm* — Michael Best & Friedrich LLP

(57) ABSTRACT

A security apparatus for a portable electronic device having an aperture includes a lock mechanism having a lock cylinder and a cam member. The lock cylinder is configured to be rotated by a key. The cam member is coupled to the lock cylinder for rotation with the lock cylinder. The cam member has a slot. The security apparatus also includes an engagement mechanism having a first finger, a second finger, and a plunger. The first finger and the second finger are configured to be inserted into the aperture of the portable electronic device. The plunger is positioned between the first finger and the second finger and has a cam follower positioned within the slot of the cam member. As the cam member is rotated by the lock cylinder, the plunger pushes the first finger and the second finger apart from each other to engage the portable electronic device.

17 Claims, 14 Drawing Sheets

Related U.S. Application Data continuation of application No. 17/345,196, filed on Jun. 11, 2021, now Pat. No. 11,686,129, which is a continuation of application No. 16/513,983, filed on Jul. 17, 2019, now Pat. No. 11,187,014, which is a continuation of application No. 15/438,102, filed on Feb. 21, 2017, now Pat. No. 10,400,482.

(60) Provisional application No. 62/299,848, filed on Feb. 25, 2016.

(58) Field of Classification Search
USPC .................................................. 70/14, 57, 58
See application file for complete search history.

(56) References Cited

U.S. PATENT DOCUMENTS

| | | | |
|---|---|---|---|
| 6,619,080 | B1 | 9/2003 | Yu |
| 6,619,081 | B1 | 9/2003 | Yu |
| 6,968,716 | B1 | 11/2005 | Ling |
| 8,842,422 | B2 | 9/2014 | Hung et al. |
| 8,991,225 | B2 | 3/2015 | Wu et al. |
| 9,062,476 | B2 | 6/2015 | Kao et al. |
| 9,187,934 | B1 | 11/2015 | Lee |
| 10,066,423 | B2 | 9/2018 | Kao et al. |
| 10,400,482 | B2 | 9/2019 | Kao et al. |
| 10,718,138 | B2 | 7/2020 | Wu |
| 11,680,429 | B2 | 6/2023 | Kao et al. |
| 2003/0106349 | A1 | 6/2003 | Broadbridge et al. |
| 2003/0200775 | A1 | 10/2003 | Yu |
| 2005/0178173 | A1 | 8/2005 | Kuo |
| 2006/0112740 | A1 | 6/2006 | Merrem |
| 2007/0169523 | A1 | 7/2007 | Lu |
| 2007/0295040 | A1 | 12/2007 | Lee |
| 2008/0034816 | A1 | 2/2008 | Lu |
| 2010/0300158 | A1 | 12/2010 | Andres et al. |
| 2012/0006080 | A1 | 1/2012 | Yu et al. |
| 2012/0216581 | A1 | 8/2012 | Tsai |
| 2014/0026625 | A1 | 1/2014 | Wu et al. |
| 2015/0059422 | A1 | 3/2015 | Kao et al. |

FOREIGN PATENT DOCUMENTS

| | | |
|---|---|---|
| CN | 101435296 A | 5/2009 |
| CN | 202509904 U | 10/2012 |
| DE | 202011000521 U1 | 6/2011 |
| EP | 1811109 A2 | 7/2007 |
| JP | H10508917 A | 9/1998 |
| JP | H1113327 A | 1/1999 |
| JP | 2007332578 A | 12/2007 |
| JP | 2010229725 A | 10/2010 |
| TW | 200934948 A | 8/2009 |
| TW | M445619 U | 1/2013 |
| TW | M447911 U | 3/2013 |
| TW | M508581 B | 9/2015 |
| WO | 9615347 A1 | 5/1996 |

OTHER PUBLICATIONS

China National Intellectual Property Administration Decision on Rejection for Application No. 202011000561.3 dated Feb. 14, 2022 (17 pages including English translation).
China National Intellectual Property Administration First Office Action for Application No. 202011000561.3 dated Apr. 23, 2021 (20 pages including English translation).
Chinese Patent Office Action for Application No. 201780013222.9 dated Oct. 25, 2019 (21 pages including English translation).
European Patent Office Extended Search Report for Application No. 17757063.7 dated Jan. 3, 2019 (7 pages).
International Search Report and Written Opinion for Application No. PCT/US2017/018698 dated May 25, 2017 (12 pages).
Japanese Patent Office action for Application No. 2018-543249 dated Jul. 14, 2020 (11 pages including English translation).
Japanese Patent Office action for Application No. 2018-543249 dated Mar. 24, 2020 (13 pages including English translation).
Taiwanese Patent Office Action and Search Report for Application No. 106106502 dated Mar. 25, 2020 (13 pages including statement of relevance).
Taiwanese Patent Office Action for Application No. 106106502 dated Sep. 3, 2020 (6 pages including statement of relevance).
Startech, "6.5' (2m) 3-in-1 Universal Laptop Cable Lock—4-Digit Combination Laptop/Desktop Security Cable Lock Compatible w/ K-Slot, Nano & Wedge Slot Computer—Anti-Theft Steel Cable", <https://www.startech.com/en-us/computer-parts/ltulock4d>, Accessed on Oct. 4, 2023, (2 pages).
Startech, "6.5' (2m) Laptop Cable Lock—Nano Slot Compatible 4 Digit Combination Security Cable Lock—Serialized Anti-Theft Vinyl Coated Steel Cable Lock for Nano Slot Computer/Device", <https://www.startech.com/en-us/computer-parts/ltlocknano>, Accessed on Oct. 4, 2023, (2 pages).
Targus, "DEFCON™ Compact Keyed Cable Lock", <https://us.targus.com/products/defcon-compact-keyed-cable-lock-asp70glx>, Accessed on Oct. 4, 2023, (5 pages).
Dicota, "Laptop Lock Nano Ultra Slim", <https://www.dicota.com/en/laptop-lock-nano-ultra-slim-1.html>, Accessed on Oct. 4, 2023, (9 pages).

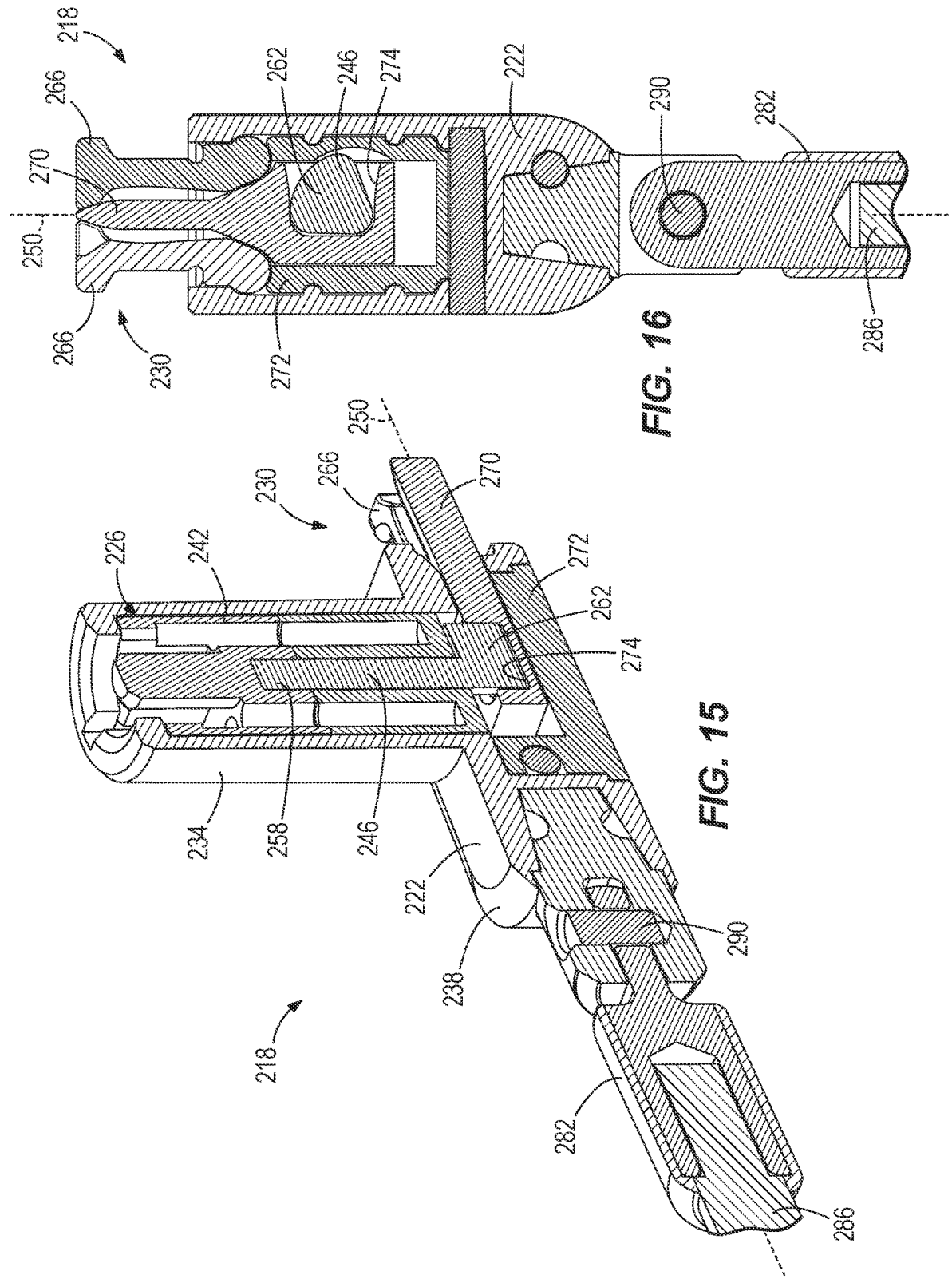

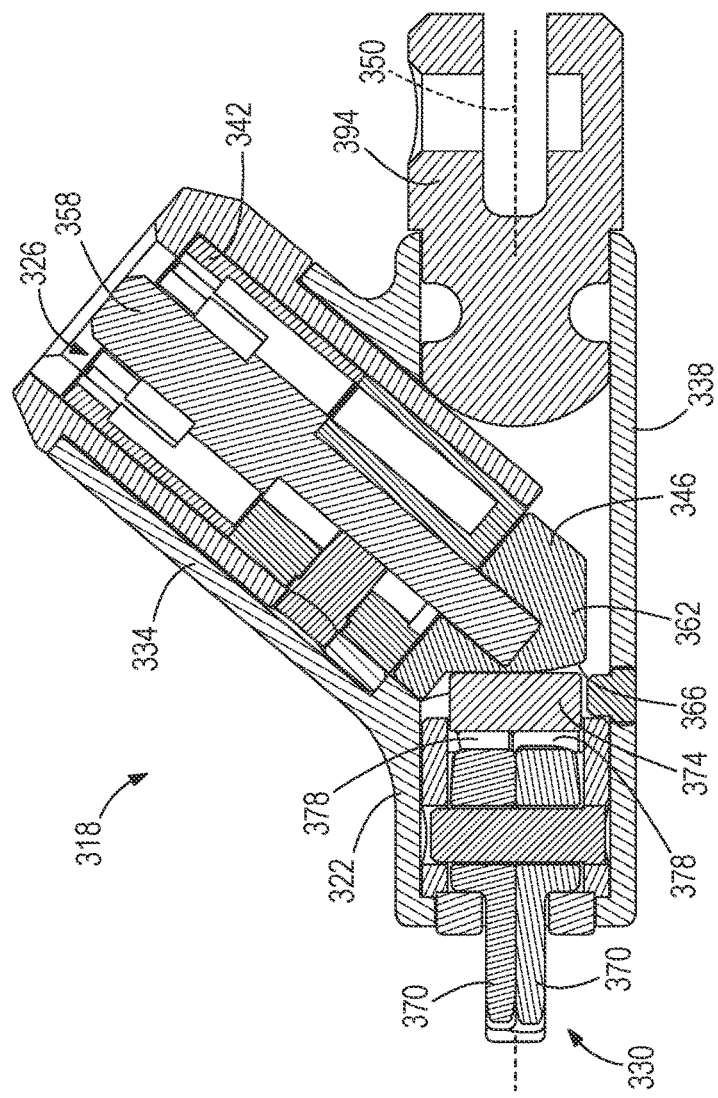
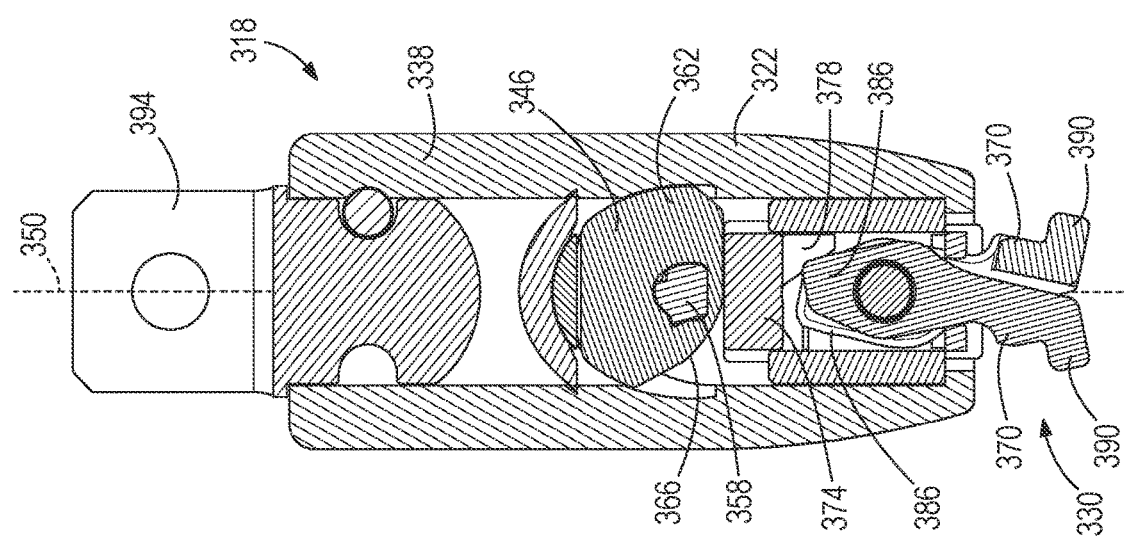

SECURITY APPARATUS FOR PORTABLE ELECTRONIC DEVICE

CROSS-REFERENCE TO RELATED APPLICATIONS

This application is a continuation of U.S. application Ser. No. 17/962,725 filed Oct. 10, 2022, which is a continuation of U.S. application Ser. No. 17/345,196 filed Jun. 11, 2021, which is a continuation of U.S. application Ser. No. 16/513,983 filed Jul. 17, 2019, which is a continuation of U.S. application Ser. No. 15/438,102 filed Feb. 21, 2017, which claims priority to U.S. Provisional Patent Application No. 62/299,848, filed Feb. 25, 2016, the entire contents of which are incorporated by reference herein.

FIELD OF THE INVENTION

The present invention relates to security apparatuses for portable electronic devices, such as laptop computers, tablet computers, smartphones, and other mobile devices.

SUMMARY

In one embodiment, the invention provides a security apparatus for a portable electronic device. The portable electronic device has an aperture. The security apparatus includes a lock mechanism having a lock cylinder and a cam member. The lock cylinder is configured to be rotated by a key. The cam member is coupled to the lock cylinder for rotation with the lock cylinder. The cam member has a slot. The security apparatus also includes an engagement mechanism having a first finger, a second finger, and a plunger. The first finger and the second finger are configured to be inserted into the aperture of the portable electronic device. The plunger is positioned between the first finger and the second finger and has a cam follower positioned within the slot of the cam member. As the cam member is rotated by the lock cylinder, the plunger pushes the first finger and the second finger apart from each other to engage the portable electronic device.

In another embodiment, the invention provides a system including a portable electronic device and the security apparatus. The portable electronic device has a housing, a processor positioned within the housing, a screen supported by the housing, and an aperture formed in the housing.

In yet another embodiment, the invention provides a security apparatus for a portable electronic device. The portable electronic device has an aperture. The security apparatus includes a lock mechanism having a lock cylinder and a cam member. The lock cylinder is configured to be rotated by a key. The cam member is coupled to the lock cylinder for rotation with the lock cylinder. The cam member has a slot. The security apparatus also includes an engagement mechanism having a first finger, a second finger, and a plunger. The first finger and the second finger are configured to be inserted into the aperture of the portable electronic device. The plunger has a cam follower positioned within the slot of the cam member so that rotation of the cam member moves the plunger relative to the first and second fingers. The engagement mechanism is movable between a first position, in which the plunger is retracted and the first and second fingers disengage the portable electronic device, and a second position, in which the plunger is extended and the first and second fingers engage the portable electronic device.

In yet another embodiment, the invention provides a security apparatus for a portable electronic device. The portable electronic device has an aperture. The security apparatus includes a lock mechanism including a lock cylinder and a cam member. The lock cylinder is configured to be rotated by a key. The cam member is coupled to the lock cylinder for rotation with the lock cylinder. The security apparatus additionally includes an engagement mechanism including a first finger, a second finger, and a plunger. The first finger and the second finger are configured to be inserted into the aperture of the portable electronic device. The plunger is positioned between the first finger and the second finger and has a cam follower configured to engage the cam member. As the cam member is rotated by the lock cylinder, the plunger pushes the first finger and the second finger apart from each other to engage the portable electronic device. The lock cylinder defines a rotational axis and the cam member is rotatable about the rotational axis.

In yet another embodiment, the invention provides a security apparatus for a portable electronic device. The portable electronic device has an aperture. The security apparatus includes a lock mechanism including a lock cylinder and a cam member. The lock cylinder is configured to be rotated by a key. The cam member is configured to be rotated by the lock cylinder. The cam member includes a stem that extends into the lock cylinder and a cam coupled to a distal end of the stem, opposite from the lock cylinder. The security apparatus further includes an engagement mechanism including a first finger, a second finger, and a plunger. The first finger and the second finger are configured to be inserted into the aperture of the portable electronic device. The plunger is positioned between the first finger and the second finger and has a cam follower configured to engage the cam member. The cam follower includes a recess that receives the cam of the cam member. The cam member is constrained to rotation about a rotational axis and the cam follower is constrained to linear translation perpendicular to the rotational axis.

Other aspects of the invention will become apparent by consideration of the detailed description and accompanying drawings.

BRIEF DESCRIPTION OF THE DRAWINGS

FIG. 15 is a cross-sectional view of the security apparatus taken along section line 15-15 of FIG. 12.

FIG. 16 is a cross-sectional view of the security apparatus taken along section line 16-16 of FIG. 12.

FIG. 21 is a cross-sectional view of the security apparatus taken along section line 21-21 of FIG. 18.

FIG. 22 is a cross-sectional view of the security apparatus taken along section line 22-22 of FIG. 18.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
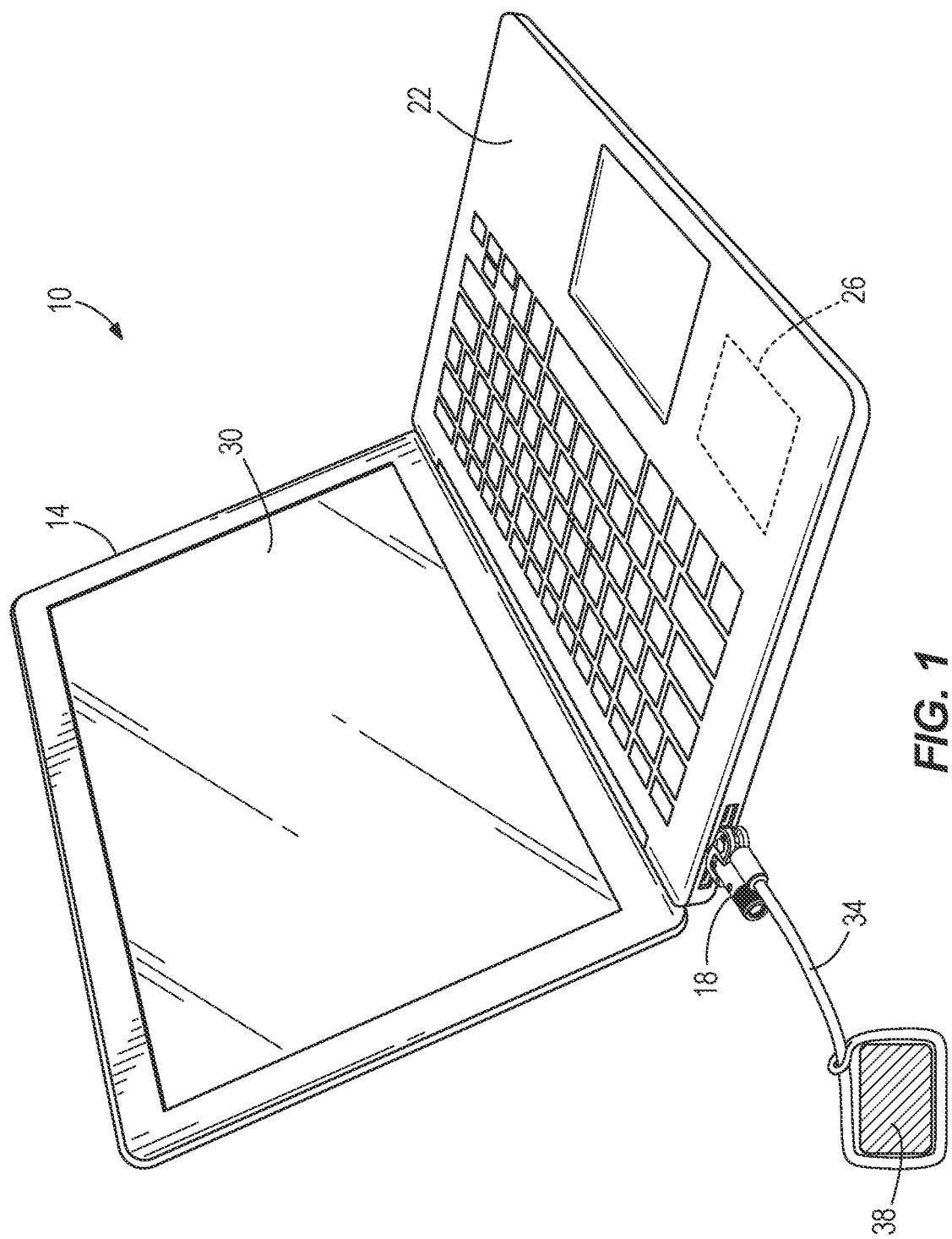
FIG. 1 illustrates a system including a portable electronic device and a security apparatus embodying the present invention.

FIG. 1 illustrates a system 10 including a portable electronic device 14 and a security apparatus 18. In the illustrated embodiment, the portable electronic device 14 is a laptop computer, but may alternatively be a tablet computer, a smartphone, an eReader, an MP3 player, and the like. The illustrated portable electronic device 14 includes a housing 22, a processor 26 positioned within the housing 22, and a screen 30 supported by the housing 22. In some embodiments, the screen 30 may be a touchscreen. In other embodiments, such as the illustrated embodiment, the portable electronic device 14 may also or alternatively include other input mechanisms, such as a keyboard, keypad, or touchpad. The security apparatus 18 is connected to the portable electronic device 14 and includes a cable 34 to secure the portable electronic device 14 to an immovable object 38, such as a table, a chair, a bracket, a wall, and the like.

Figure 4:
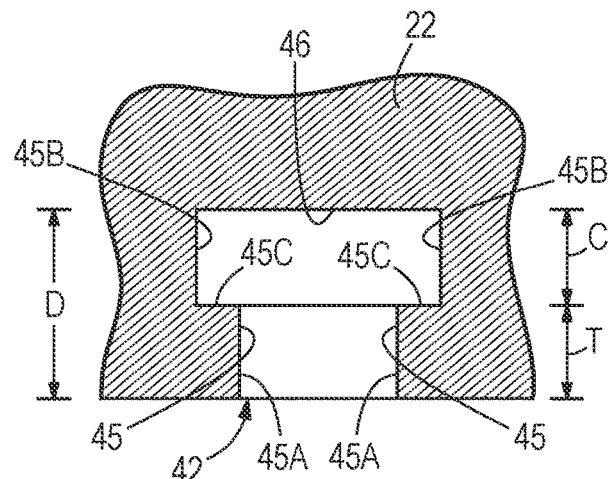
FIG. 4 is a cross-sectional view of the portion of the portable electronic device taken along section line 4-4 of FIG. 3.
Figure 2:
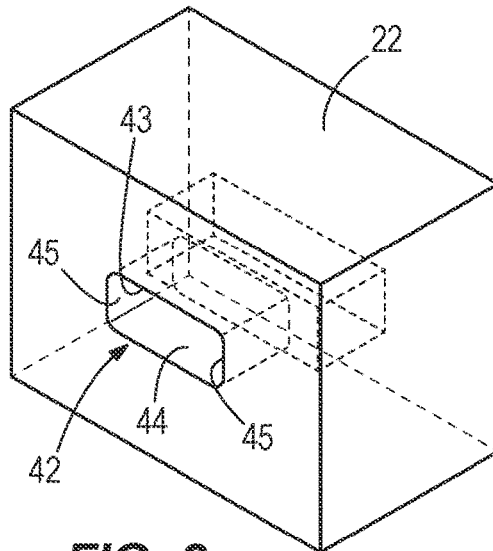
FIG. 2 is a perspective view of a portion of the portable electronic device, the portable electronic device having an aperture.
Figure 3:
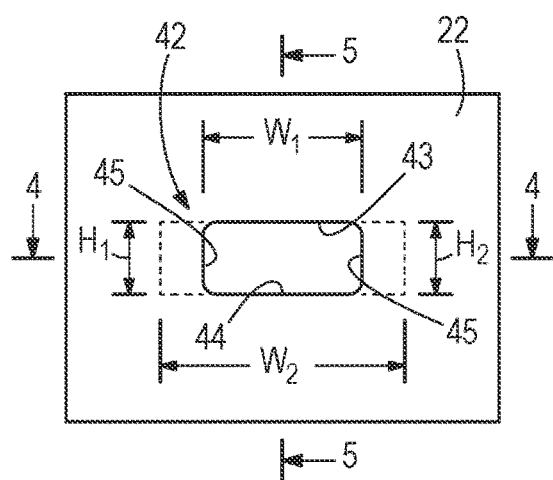
FIG. 3 is a front view of the portion of the portable electronic device shown in FIG. 2.
Figure 5:
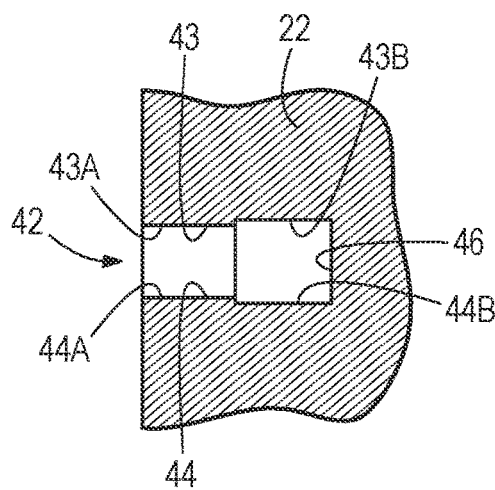
FIG. 5 is a cross-sectional view of the portion of the portable electronic device taken along section line 5-5 of FIG. 3.

As shown in FIGS. 2-5, the portable electronic device 14 has an aperture 42, or slot, formed in the housing 22. The illustrated aperture 42 is generally smaller than existing security slots in portable electronic devices, and is specifically designed for thinner devices with smaller housings. The aperture 42 is defined by an upper wall 43, a lower wall 44, two opposing sidewalls 45, and a rear wall 46. As shown in FIG. 5, the upper and lower walls 43, 44 are generally parallel to each other. The upper wall 43 has a first section 43A near the outer surface of the housing 22, and a second section 43B inward of the first section 43A. Similarly, the lower wall 44 has a first section 44A near the outer surface of the housing 22, and a second section 44B inward of the first section 44A. The second sections 43B, 44B are slightly offset relative to the first sections 43A, 44A. As shown in FIG. 4, the sidewalls 45 are generally parallel to each other and perpendicular to the upper and lower walls 43, 44. Each sidewall 45 has a first section 45A near the outer surface of the housing 22, and a second section 45B inward of the first section 45A. The second sections 45B are outwardly offset from the first sections 45A such that a shoulder or ledge 45C is formed between the first and second sections 45A, 45B. The rear wall 46 extends between and connects the upper wall 43, the lower wall 44, and the sidewalls 45. The rear wall 46 also closes the back of the aperture 42 to separate the aperture 42 from the internal components of the device 14.

By way of example, the aperture 42 can have an external width $W_1$ (measured between the first sections 44A of the sidewalls 44) of about 6 mm. The aperture 42 can also have an external height $H_1$ (measured between the upper and lower walls 43A, 43B) of about 2.5 mm. In addition, the aperture 42 can have an internal width $W_2$ (measured between the second sections 44B of the sidewalls 44) of at least 9 mm. Further, the aperture 42 can have an internal depth D (measured from the outer surface of the housing 22 to the rear wall 46) of at least 7 mm. The internal depth D is defined by a wall thickness T (i.e., the length of the first sections 43A, 44A, 45A) and a clearance depth C (i.e., the length of the second sections 43B, 44B, 45B). In some embodiments, the wall thickness T may be 3.5 mm±0.25 mm. Additionally, the clearance depth C may be at least 3.5 mm. The aperture 42 can also have an internal height $H_2$ (measured between the second sections 43B, 44B of the upper and lower walls 43, 44) of at least 2.65 mm. In other embodiments, the aperture 42 can have other dimensions. The aperture 42 is configured to receive an engagement mechanism of a security apparatus, such as one of the security apparatuses described below.

FIGS. 6-11 illustrate one example of the security apparatus 18. The security apparatus 18 includes a cylindrical body 48, a lock mechanism 50, and an engagement mechanism 54. The cylindrical body 48 is made of a relatively hard material, such as metal, and houses other components of the security apparatus 18. In other embodiments, the cylindrical body 48 can have other, non-cylindrical shapes. The illustrated body 48 includes a knurled section 58 to facilitate grasping and holding the security apparatus 18.

Figure 6:
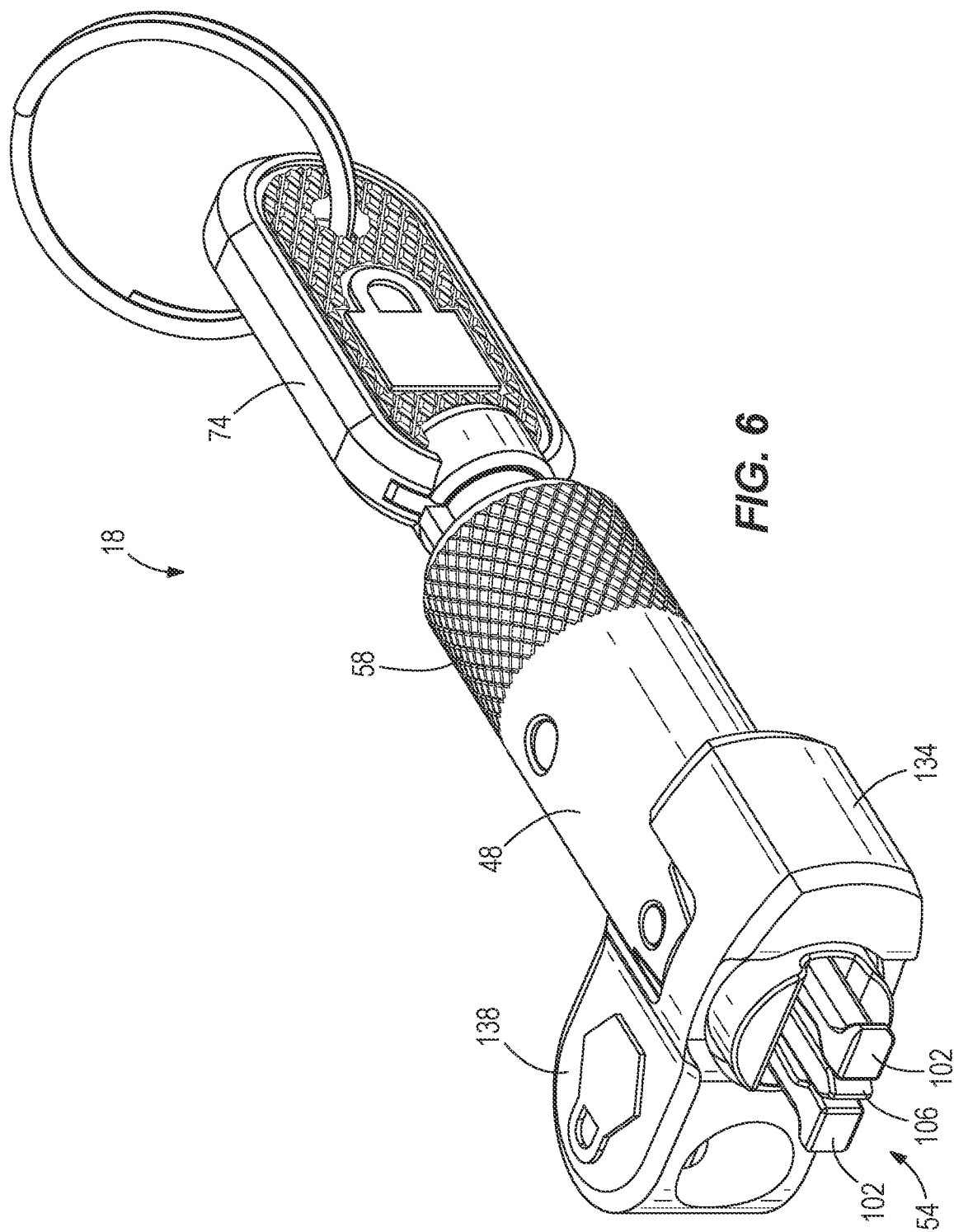
FIG. 6 is a perspective view of the security apparatus shown in FIG. 1.
Figure 9:
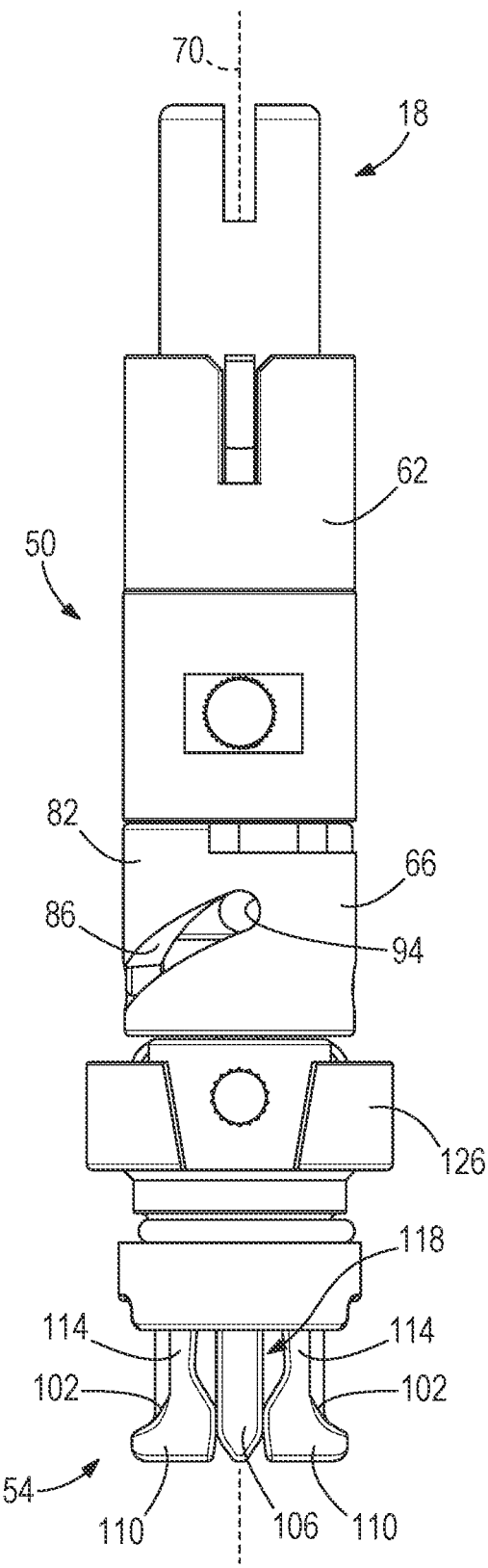
FIG. 9 is a top view of the security apparatus of FIG. 6 with a cylindrical body removed.
Figure 10:
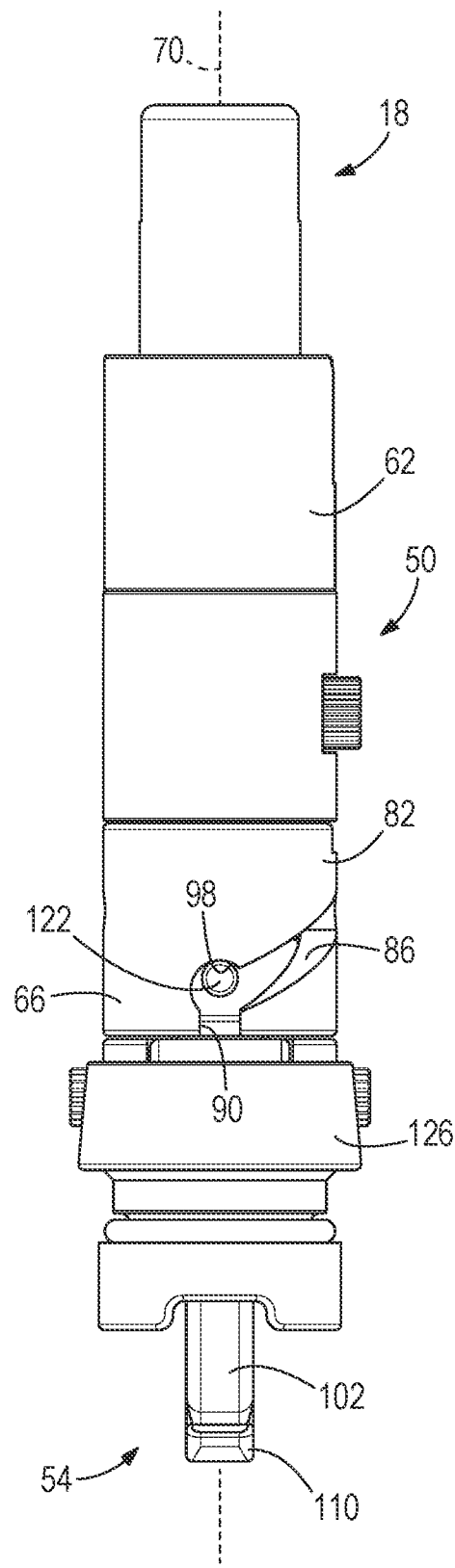
FIG. 10 is a side view of the security apparatus of FIG. 6 with the cylindrical body removed.
Figure 11:
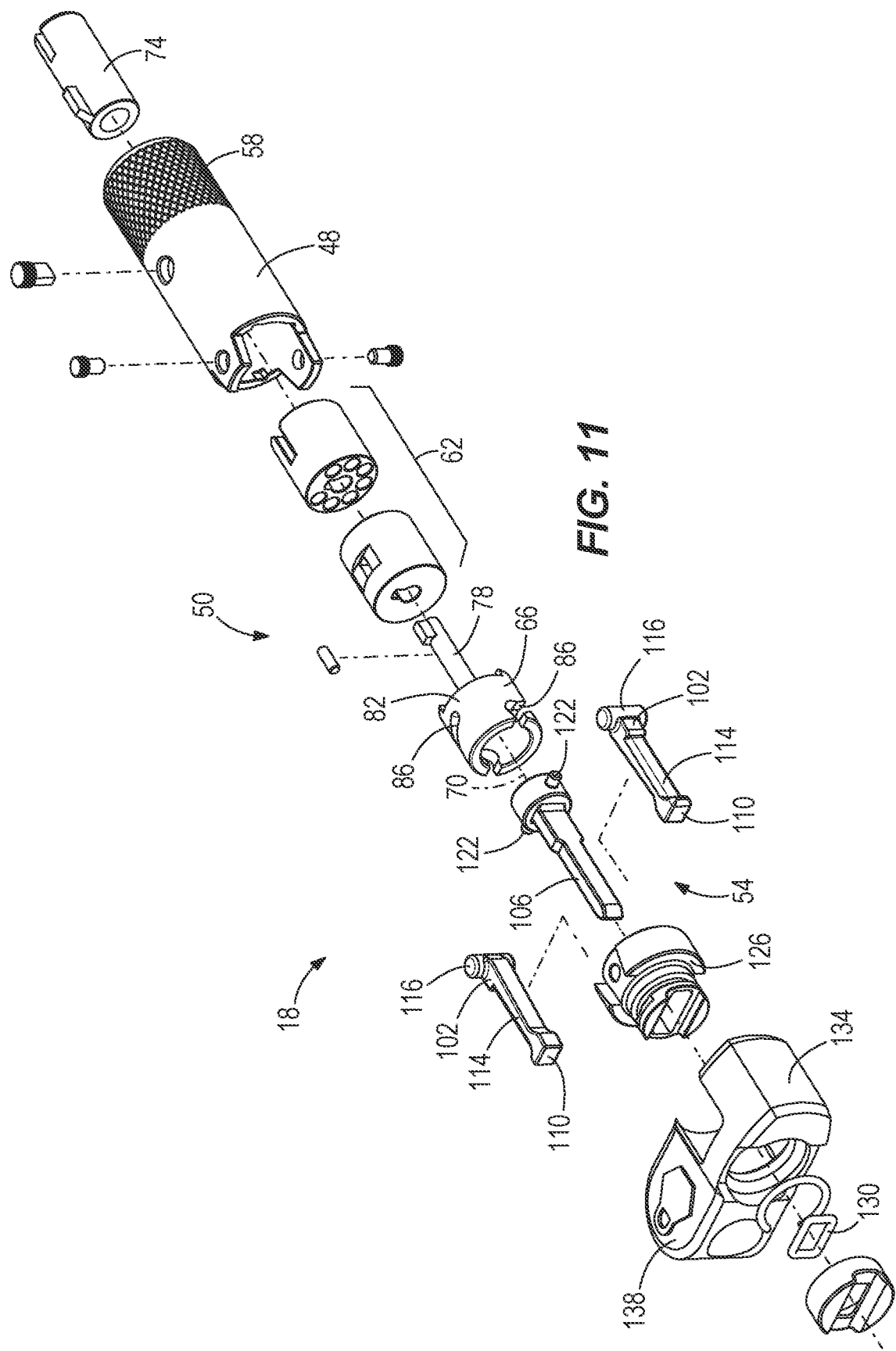
FIG. 11 is an exploded perspective view of the security apparatus of FIG. 6.

As shown in FIGS. 9-11, the illustrated lock mechanism 50 includes a lock cylinder 62 and a cam member 66. The lock cylinder 62 and the cam member 66 are positioned within the cylindrical body 48. The lock cylinder 62 is arranged in line with the engagement mechanism 54 along a longitudinal axis 70 of the security apparatus 18. As such, the lock cylinder 62 also defines the longitudinal axis 70 and is actuatable (e.g., rotatable) about the axis 70. In the illustrated embodiment, the lock cylinder 62 is rotatable by, for example, a key 74 (FIG. 6). In other embodiments, the lock mechanism 50 may include a combination-style lock.

The cam member 66 is coupled to the lock cylinder 62 for rotation with the lock cylinder 62 about the longitudinal axis 70. In particular, the cam member 66 includes a stem 78 that extends into the lock cylinder 62, and a cam body 82 positioned forward of the lock cylinder 62 and engaging the engagement mechanism 54. In the illustrated embodiment, the cam member 66 has slots 86 formed in the cam body 82. The illustrated slots 86 are arcuate slots that curve around the circumference of the cam body 82. The slots 86 are also obliquely angled relative to the longitudinal axis 70 so that the slots 86 helically wind around cam body 82. Each slot 86 includes a first end 90 adjacent the engagement mechanism 54, a second end 94 adjacent the lock cylinder 62, and a detent 98 formed at the first end 90. In other embodiments, the cam member 66 may include fewer or more slots 86 formed in the cam body 82.

Figure 8:
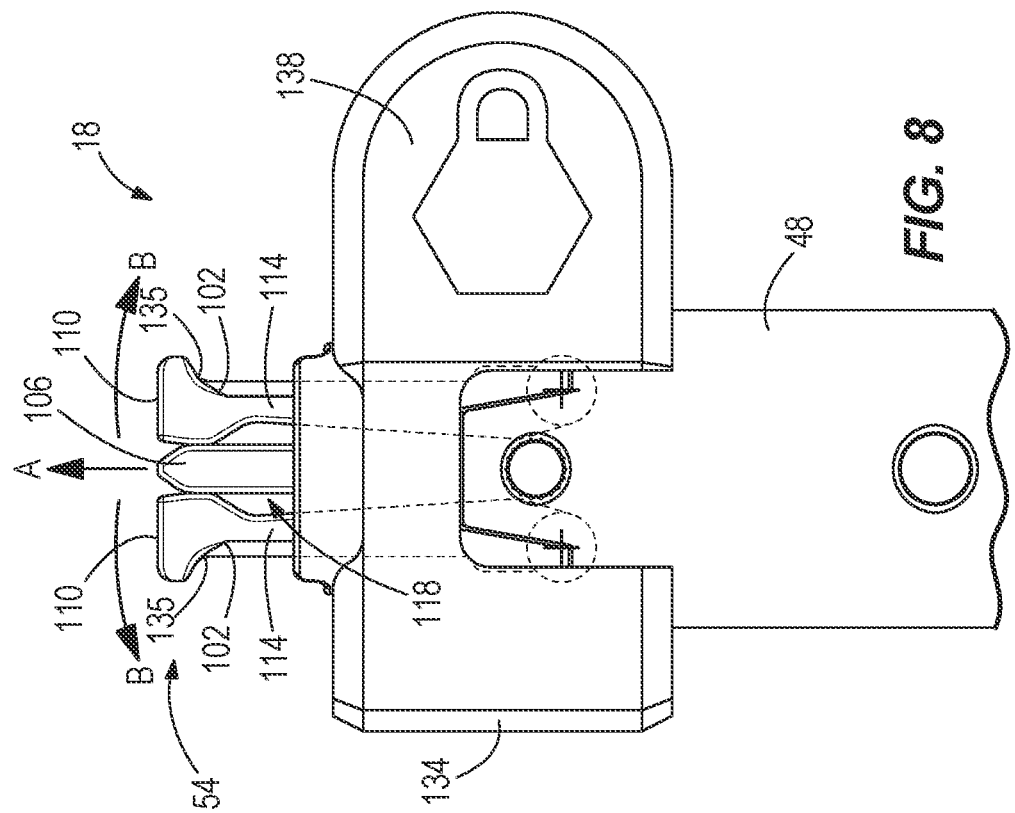
FIG. 8 is a top view of the portion of the security apparatus of FIG. 6 while in a locked position.
Figure 7:
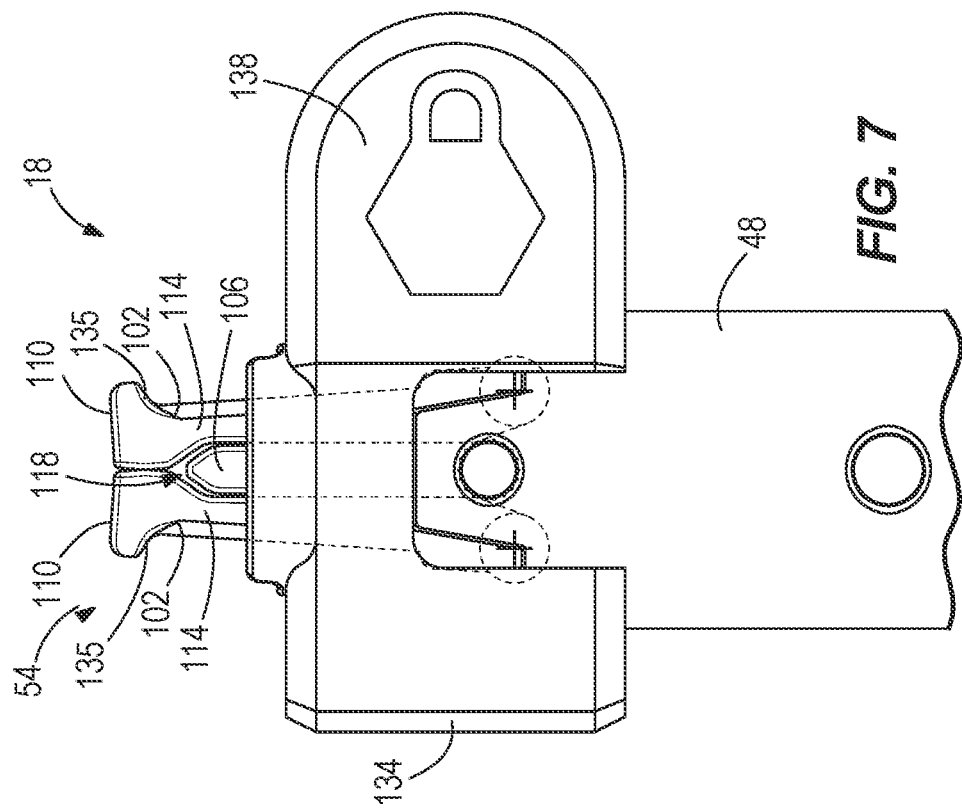
FIG. 7 is a top view of a portion of the security apparatus of FIG. 6 while in an unlocked position.

As shown in FIGS. 7-8 and 11, the illustrated engagement mechanism 54 includes two fingers 102 and a plunger 106. The fingers 102 are movable (e.g., pivotable) between an unlocked or retracted position (FIG. 7) and a locked or expanded position (FIG. 8). When the fingers 102 are in the unlocked position, the engagement mechanism 54 is insertable into and removable from the aperture 42 in the portable electronic device 14 (FIGS. 1-5). When the fingers 102 are in the locked position, the engagement mechanism 54 engages the housing 22 of the portable electronic device 14 to secure the security apparatus 18 to the device 14. Each finger 102 includes an enlarged distal end 110 and a relatively narrower stem 114. The enlarged distal ends 110 facilitate engaging (e.g., contacting or "grabbing) the housing 22 of the portable electronic device 14 so that the security apparatus 18 cannot be pulled out of the aperture 42. Particularly, the enlarged distal ends 110 engage the ledges 45C of the sidewalls 45 (FIG. 4) formed by the aperture 42. The relatively narrower stems 114 create a recessed area 118 between the fingers 102 for receiving the plunger 106. Each finger 102 also includes a boss 116 at an end of the stem 114 opposite from the enlarged distal end 110. The bosses 116 define spaced apart pivot axes for the fingers 102.

The plunger 106 is positioned between the fingers 102 to selectively move the fingers 102 from the unlocked position to the locked position. The plunger 106 includes cam followers 122 that are received in the slots 86 of the cam member 66. In the illustrated embodiment, the cam followers 122 are pins. In other embodiments, the plunger 106 may include fewer or more cam followers 122, depending on the number of slots 86 in the cam member 66. The plunger 106 is movable (e.g., slidable) along the longitudinal axis 70 to selectively actuate the fingers 102. The security apparatus 18 also includes an end cap 126 coupled to the cylindrical body 48 opposite from the lock cylinder 62 to help retain the fingers 102 and the plunger 106 in connection with the lock mechanism 50 and the body 48.

Referring to FIG. 7, in an initial position (i.e., when the fingers 102 are in the unlocked position), the cam followers 122 of the plunger 106 are positioned at the second ends 94 of the slots 86 in the cam member 66. In this position, a distal end section of the plunger 106 is received within the recessed area 118 formed between the fingers 102. The fingers 102 are moved (e.g., pivoted) toward each other so that the enlarged distal ends 110 contact each other. In some embodiments, the engagement mechanism 54 may include a spring element, such as an elastomeric ring 130 shown in FIG. 11, to help move the fingers 102 toward each other. In this position, the engagement mechanism 54 can be inserted into or removed from the aperture 42 of the portable electronic device 14.

Referring to FIGS. 8-10, when the cam member 66 is rotated (e.g., by rotating the lock cylinder 62 with the key 74), the cam followers 122 follow the slots 86 of the cam member 66 to move the plunger 106 axially outward. As the plunger 106 slides axially outward (i.e., in the direction of arrow A), the plunger 106 pushes the fingers 102 apart from each other (i.e., in the direction of arrows B). More particularly, the fingers 102 are pushed and expanded radially outward to engage the housing 22 of the portable electronic device 14 (if the engagement mechanism 54 is inserted into the aperture 42 of the portable electronic device 14). The cam member 66 is rotated about 90 degrees until the cam followers 122 reach the first ends 90 of the slots 86. As shown in FIG. 10, each cam follower 122 is received in the corresponding detent 98 at the first end 90 of the slot 86 when in the locked position. In this position, the engagement mechanism 54 is inhibited from being removed from (e.g., pulled out of) the aperture 42 of the device 14. In addition, the detents 98 provide recesses that inhibit the cam followers 122 from being bumped out of the first ends 90 of the slots 86 and moved back toward the second ends 94 of the slots 86 without purposefully rotating the cam member 66 (e.g., with the key 74).

As shown in FIGS. 6 and 11, the security apparatus 18 also includes a cable mount 134 supported by the cylindrical body 48. The illustrated cable mount 134 is positioned generally between the lock mechanism 50 and the engagement mechanism 54. The cable mount 134 includes a boss 138 extending radially from the cylindrical body 48. The cable mount 134 is configured to securely receive an end of the flexible cable 34, which can be wrapped around an immovable object 38 (FIG. 1) to secure the security apparatus 18 (and, thereby, the portable electronic device 14) to the immovable object 38.

FIGS. 12-17 illustrate another example of a security apparatus 218. The security apparatus 218 is similar to the security apparatus 18 discussed above with reference to FIGS. 6-11. Differences between the two security apparatuses 18, 218 are described below.

The security apparatus 218 includes a body 222, a lock mechanism 226, and an engagement mechanism 230. The body 222 has a first body portion 234 that generally houses the lock mechanism 226, and a second body portion 238 that generally houses the engagement mechanism 230. In the illustrated embodiment, the body portions 234, 238 are arranged generally perpendicular to each other so that the first body portion 234 extends upward (e.g., away from a table or other surface supporting the portable electronic device 14) relative to the second body portion 238.

Figure 12:
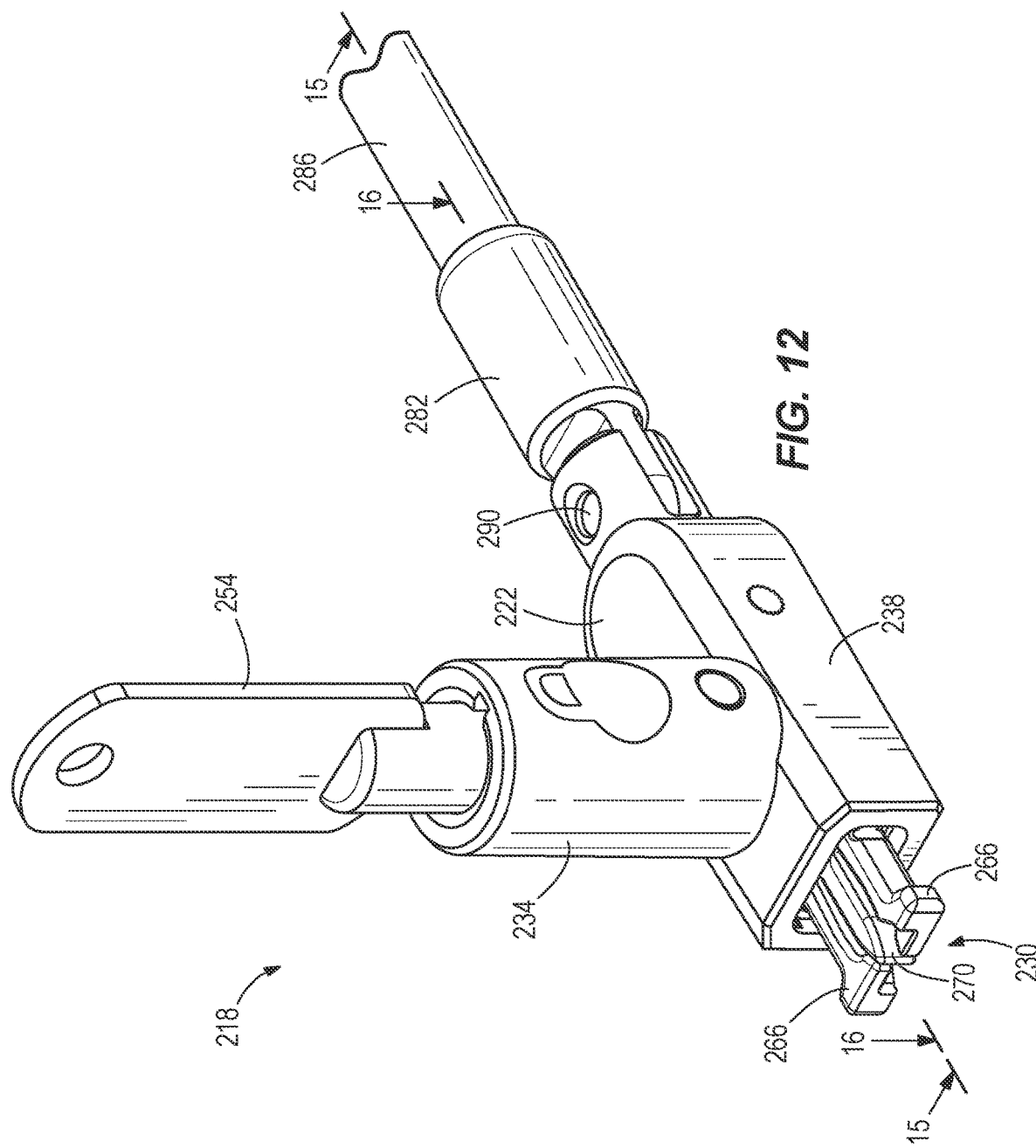
FIG. 12 is a perspective view of another security apparatus embodying the present invention.
Figure 17:
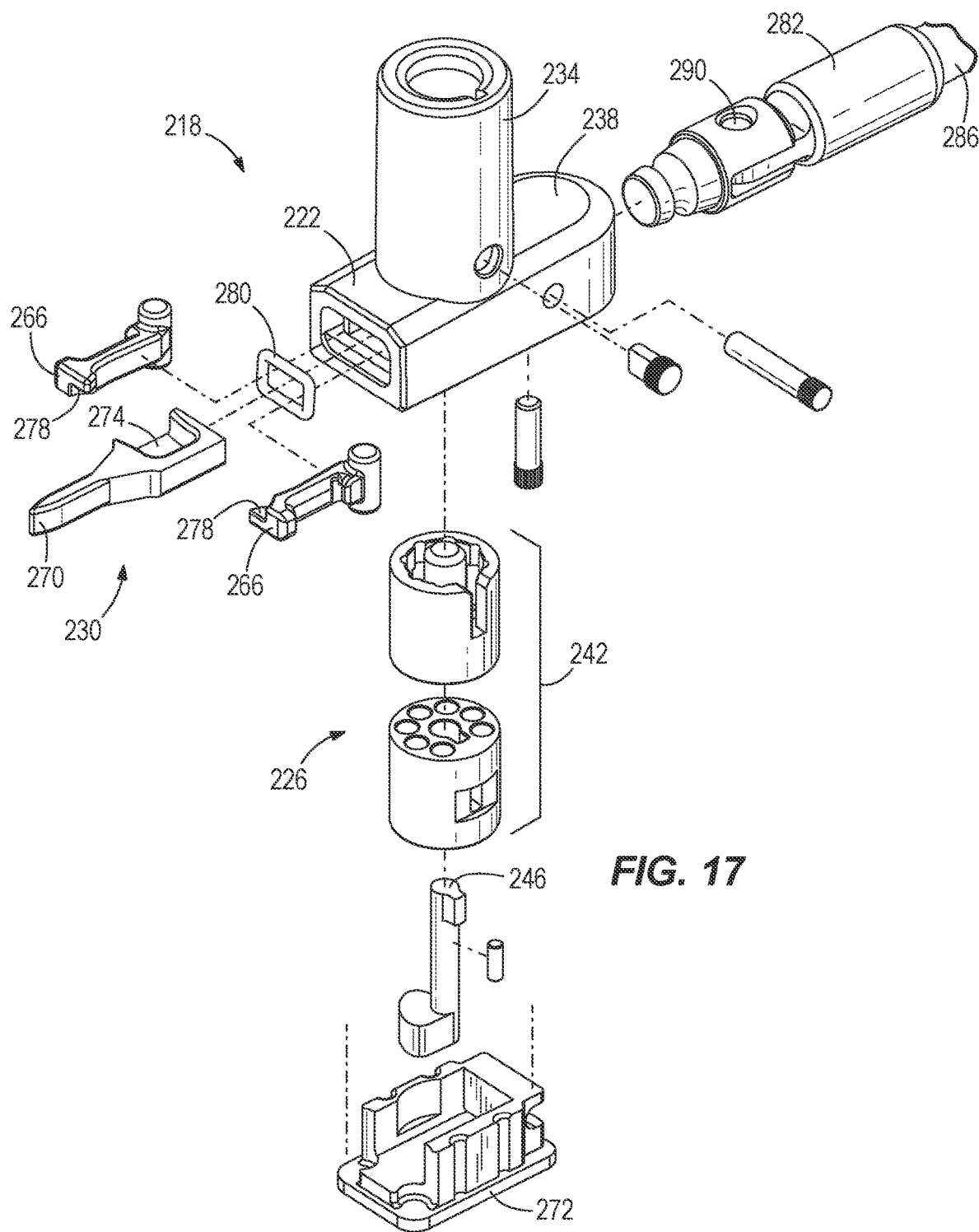
FIG. 17 is an exploded perspective view of the security apparatus of FIG. 12.

As shown in FIGS. 15-17, the illustrated lock mechanism 226 includes a lock cylinder 242 and a cam member 246. The lock cylinder 242 is arranged at 90 degrees relative to a longitudinal axis 250 of the engagement mechanism 230 and the second body portion 238. The lock cylinder 242 is rotatable by, for example, a key 254 (FIG. 12). In other embodiments, the lock mechanism 226 may include a combination-style lock.

The cam member 246 is coupled to the lock cylinder 242 for rotation with the lock cylinder 242. In particular, the cam member 246 includes a stem 258 that extends into the lock cylinder 242, and an enlarged cam 262 coupled to a distal end of the stem 258, opposite from the lock cylinder 242. The enlarged cam 262 engages the engagement mechanism 230 to actuate the engagement mechanism 230.

Figure 14:
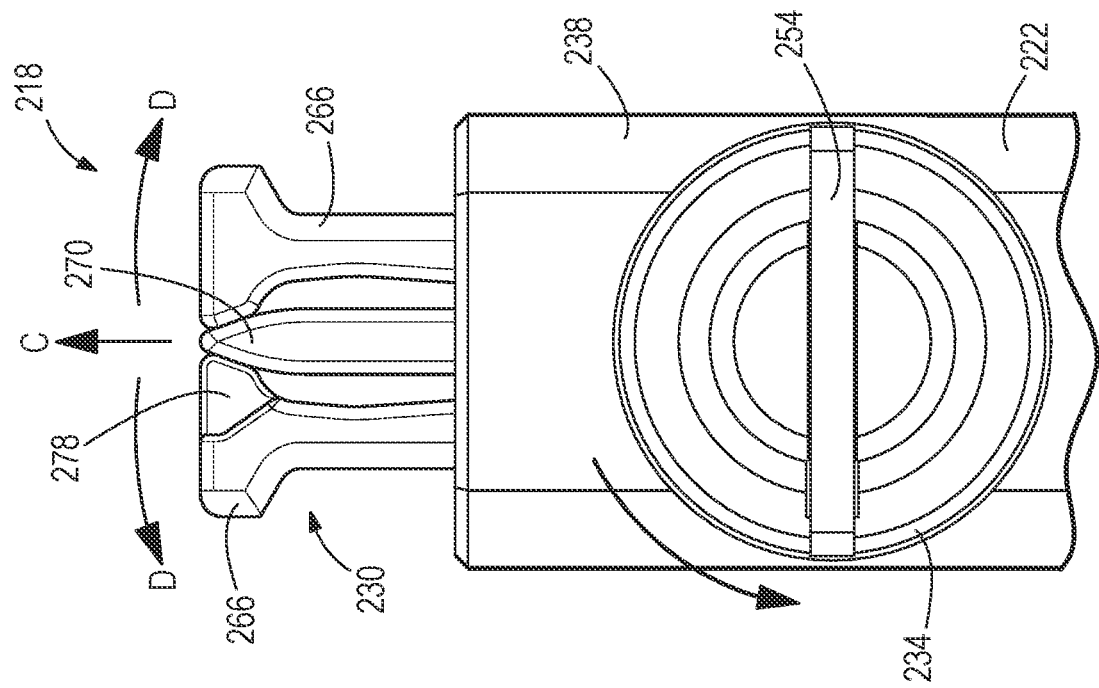
FIG. 14 is a top view of the portion of the security apparatus of FIG. 12 while in a locked position.

With continued reference to FIGS. 13-17, the illustrated engagement mechanism 230 includes two fingers 266 and plunger 270. The fingers 266 are movable (e.g., pivotable) between an unlocked or retracted position (FIG. 13) and a locked or expanded position (FIG. 14). When the fingers 266 are in the unlocked position, the engagement mechanism 230 is insertable into and removable from the aperture 42 in the portable electronic device 14 (FIGS. 1-5). When the fingers 266 are in the locked position, the engagement mechanism 230 engages the housing 22 of the portable electronic device 14 to secure the security apparatus 218 to the device 14.

The illustrated plunger 270 is partially received in a guide block 272. The guide block 272 helps restrict movement of the plunger 270 to linear sliding movement in the direction of arrow C. The guide block 272 also forms part of a bottom section of the body 222. In the illustrated embodiment, the guide block 272 is a separate piece from the rest of the body 222 to facilitate assembling the security apparatus 218.

Figure 13:
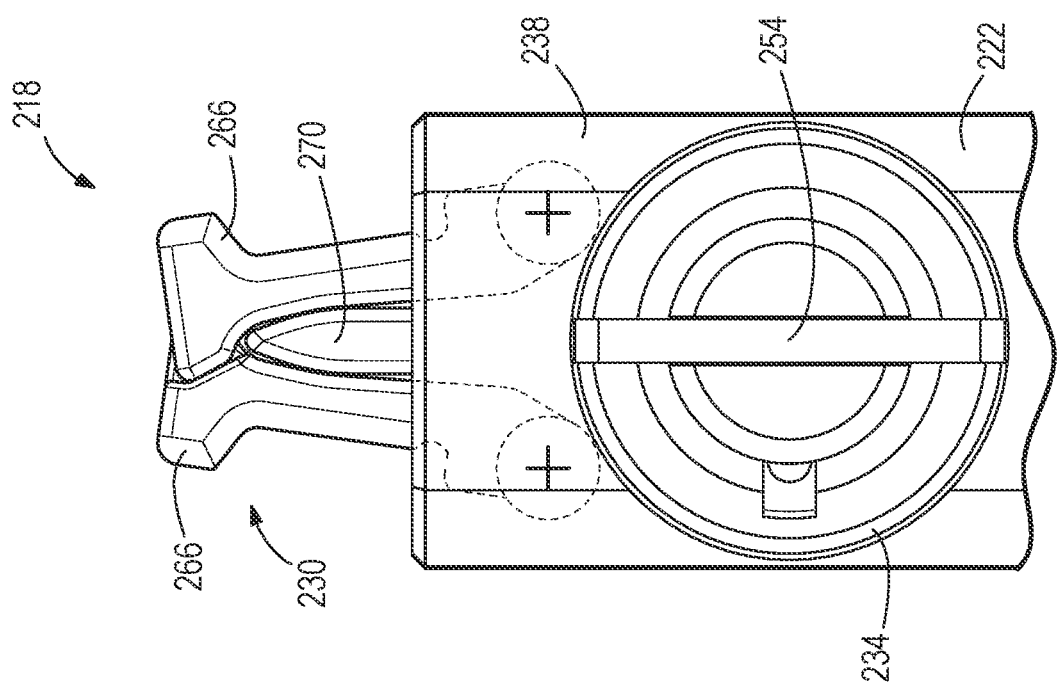
FIG. 13 is a top view of a portion of the security apparatus of FIG. 12 while in an unlocked position.

In the illustrated embodiment, the fingers 266 are moved between the unlocked and locked positions by rotating the cam member 246 with the lock cylinder 242. More particularly, the plunger 270 includes a recess 274, or cam follower, that receives the enlarged cam 262 of the cam member 246. When the cam member 246 is rotated (e.g., by rotating the lock cylinder 242 with the key 254), the enlarged cam 262 pushes the plunger 270 axially outward or inward, depending on which direction the cam member 246 is rotated. As the plunger 270 slides axially outward (i.e., in the direction of arrow C), the fingers 266 are pushed apart and expanded radially outward (i.e., in the direction of arrows D). As the plunger 270 slides axially inward, the fingers 266 can move toward each other. In the illustrated embodiment, the distal ends of the fingers 266 include corresponding cutouts 278 such that the fingers 266 can slightly overlap when in the unlocked position (as shown in FIG. 13). In some embodiments, the engagement mechanism 230 may include a spring element, such as an elastomeric ring 280 shown in FIG. 17, to help move the fingers 266 toward each other.

As shown in FIGS. 12 and 17, the security apparatus 218 also includes a cable mount 282 supported at an end of the body 222 opposite from the engagement mechanism 230. The cable mount 282 is configured to securely receive an end of a flexible cable 286. The flexible cable 286 can be, for example, wrapped around an immovable object 38 (FIG. 1) to secure the security apparatus 218 to the immovable object 38. The illustrated cable mount 282 also includes a joint 290 that allows the cable 286 to be pivoted relative to the body 222.

FIGS. 18-23 illustrate another example of a security apparatus 318. The security apparatus 318 is similar to the security apparatus 18 discussed above with reference to FIGS. 6-11. Differences between the two security apparatuses 18, 318 are described below.

The security apparatus 318 includes a body 322, a lock mechanism 326, and an engagement mechanism 330. The body 322 has a first body portion 334 that generally houses the lock mechanism 326, and a second body portion 338 that generally houses the engagement mechanism 330. The body portions 334, 338 are obliquely angled relative to each other. For example, in the illustrated embodiment, the first body portion 334 is angled about 45 degrees relative to the second body portion 338 such that the first body portion 334 extends upwardly and rearwardly from the second body portion 338.

Figure 18:
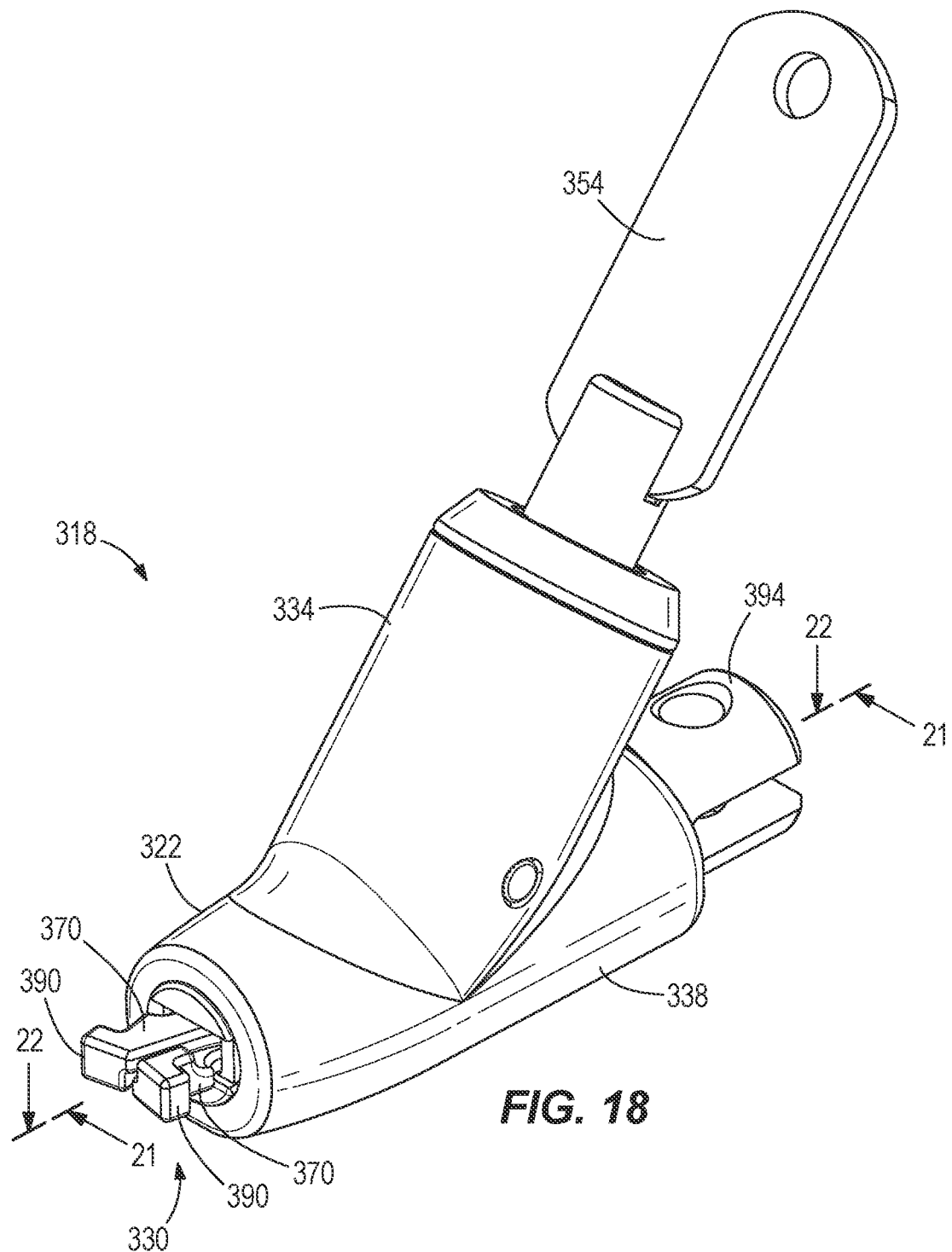
FIG. 18 is a perspective view of yet another security apparatus embodying the present invention.

As shown in FIGS. 21-22, the illustrated lock mechanism 326 includes a lock cylinder 342 and a cam member 346. The lock cylinder 342 is arranged at 45 degrees relative to a longitudinal axis 350 of the engagement mechanism 330 and the second body portion 338. The lock cylinder 342 is rotatable by, for example, a key 354 (FIG. 18). In other embodiments, the lock mechanism 326 may include a combination-style lock.

The cam member 346 is coupled to the lock cylinder 342 for rotation with the lock cylinder 342. In particular, the cam member 346 includes a stem 358 that extends into the lock cylinder 342, and an enlarged cam 362 coupled to a distal end of the stem 358, opposite from the lock cylinder 342. The illustrated enlarged cam 362 includes a cam surface 366 facing and contacting the engagement mechanism 330.

Figure 20:
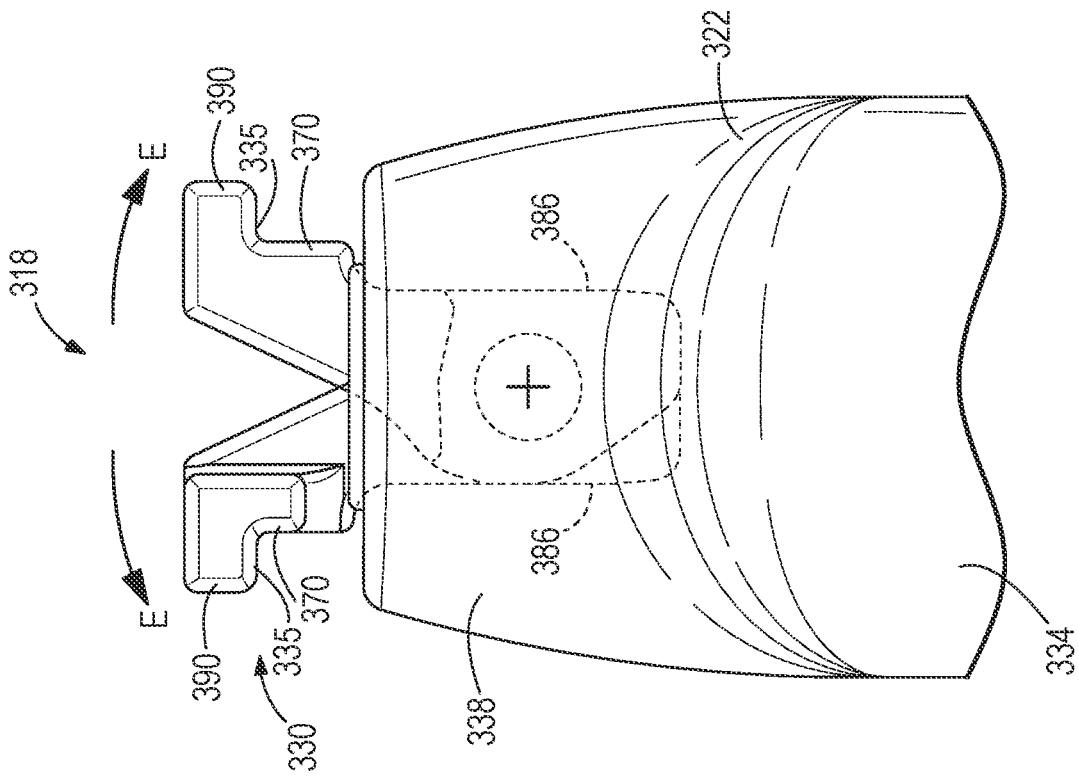
FIG. 20 is a top view of the portion of the security apparatus of FIG. 18 while in a locked position.
Figure 19:
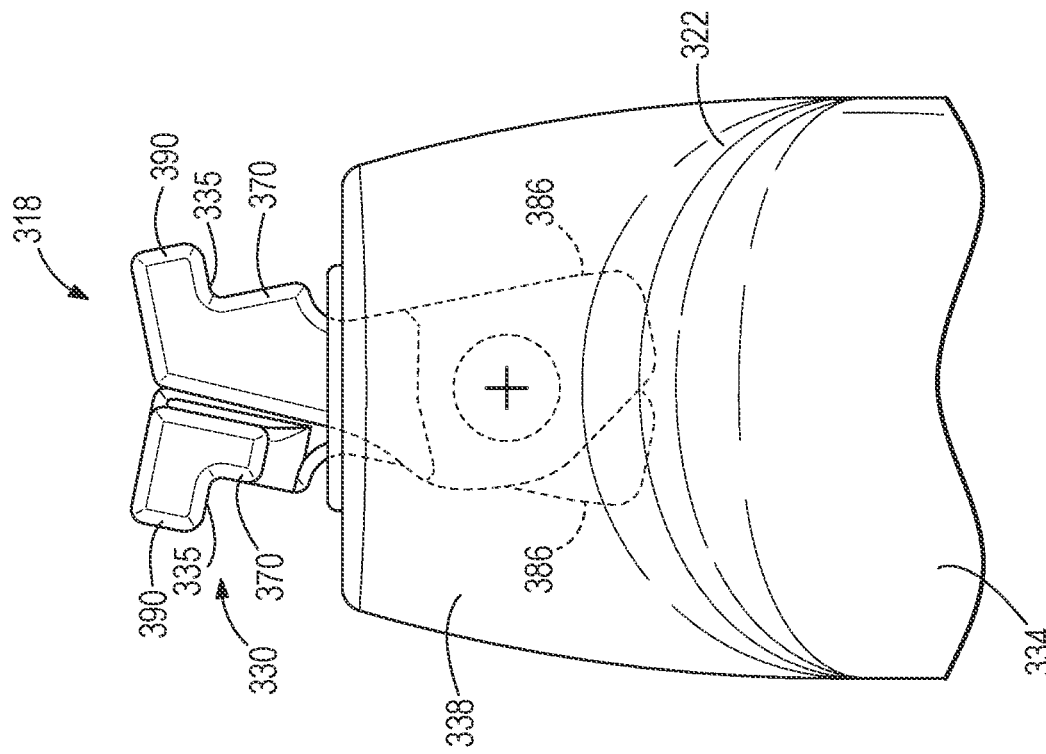
FIG. 19 is a top view of a portion of the security apparatus of FIG. 18 while in an unlocked position.

The illustrated engagement mechanism 330 includes two fingers 370 and a cam follower 374. The fingers 370 are movable (e.g., pivotable) between an unlocked or retracted position (FIG. 19) and a locked or expanded position (FIG. 20). When the fingers 370 are in the unlocked position, the engagement mechanism 330 is insertable into and removable from the aperture 42 in the portable electronic device 14 (FIGS. 1-5). When the fingers 370 are in the locked position, the engagement mechanism 330 engages the housing 22 of the portable electronic device 14 to secure the security apparatus 318 to the device 14.

The cam follower 374 is positioned between the fingers 370 and the cam member 346. The illustrated cam follower 374 includes two wings 378, each of which engages one of the fingers 370. The wings 378 have ramped surfaces 382 that selectively press proximal ends 386 of the fingers 370 together, causing distal ends 390 of the fingers 370 to spread apart.

In the illustrated embodiment, the fingers 370 are moved between the unlocked and locked positions by rotating the cam member 346 with the lock cylinder 342. More particularly, the cam follower 374 abuts the cam surface 366 of the cam member 346. As the cam member 346 is rotated (e.g., by rotating the lock cylinder 342 with the key 354), the enlarged cam 362 is rotated to move the cam surface 366 relative to the cam follower 374. When a recessed portion of the cam surface 366 is aligned and in contact with the cam follower 374, the cam follower 374 moves (e.g., slides) away from the fingers 370 (to the right in FIG. 21). As the cam follower 374 moves away from the fingers 370, the wings 378 of the cam follower 374 allow the proximal ends 386 of the fingers 370 to spread apart so that the distal ends 390 of the fingers 370 move toward each other. When a protruding portion of the cam surface 366 is aligned and in contact with the cam follower 374, the cam member 346 pushes (e.g., slides) the cam follower 374 toward the fingers 370 (to the left in FIG. 21). As the cam follower 374 moves toward the fingers 370, the wings 378 of the cam follower 374 push the proximal ends 386 of the fingers 370 together so that the distal ends 390 of the fingers 370 are spread apart from each other (i.e., in the direction of arrows E).

Figure 23:
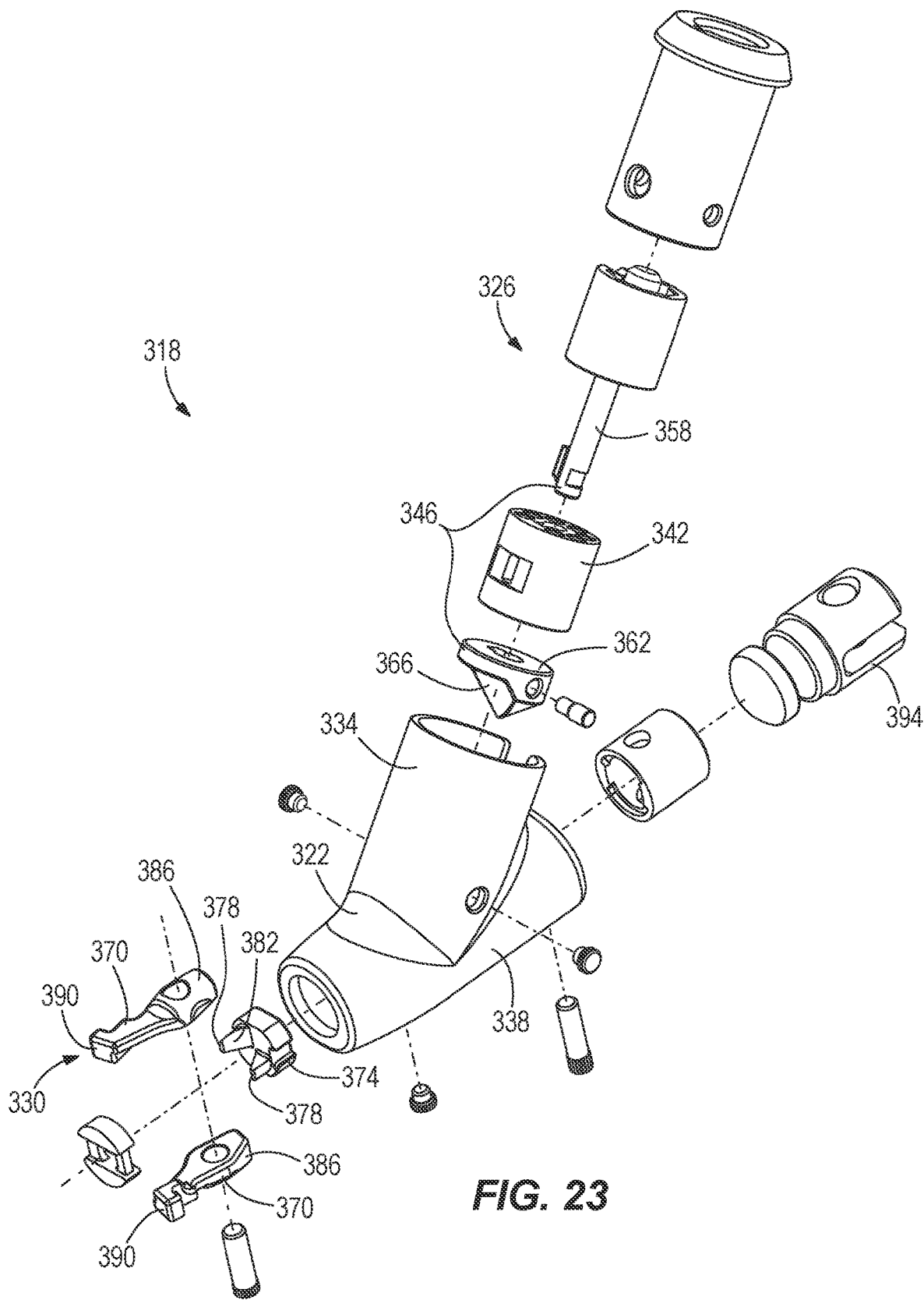
FIG. 23 is an exploded perspective view of the security apparatus of FIG. 18.

As shown in FIGS. 18 and 23, the security apparatus 318 also includes a cable mount 394 supported on an end of the body 322 opposite from the engagement mechanism 330. Only part of the cable mount 394 is shown in the figures, but the cable mount 394 may be constructed similar to the cable mount 282 shown in FIGS. 12-17. The cable mount 394 is configured to securely receive a flexible cable (not shown, but similar to the cables 34, 286 described above). The flexible cable can be, for example, wrapped around an immovable object 38 (FIG. 1) to secure the security apparatus 318 to the immovable object 38.

The illustrated security apparatuses 18, 218, 318 provide relatively compact lock and engagement mechanisms that facilitate interfacing with thinner portable electronic devices. In particular, the security apparatuses 18, 218, 318 are designed to engage relatively smaller apertures in portable electronic devices, yet still provide at least the same strength of security as conventional laptop locks. Further, the security apparatuses 18, 218, 318 are physically compact so that a portable electronic device can lay flat on a surface (e.g., table or desk) without interference from the attached security apparatus 18, 218, 318.

Various features and advantages of the invention are set forth in the following claims.

What is claimed is:

1. A security apparatus for a portable electronic device, the portable electronic device having an aperture, the security apparatus comprising:
   a housing;

an engagement mechanism configured to secure the security apparatus to the portable electronic device in a locked position and configured to disengage the security apparatus from the portable electronic device in an unlocked position, the engagement mechanism including a first finger and a second finger that are coupled to the housing and rotatable about a shared axis, wherein the first finger has a first engagement surface configured to extend into the aperture to engage the portable electronic device and a proximal end opposite to the first engagement surface, wherein the second finger has a second engagement surface configured to extend into the aperture to engage the portable electronic device and a proximal end opposite to the second engagement surface;

a locking mechanism arranged in the housing and including a follower configured to move into engagement with the proximal end of the first finger and the proximal end of the second finger to move the engagement mechanism from the unlocked position to the locked position, wherein the follower engages the proximal end of the first finger and the proximal end of the second finger in the locked position, the follower terminating at a location between the shared axis and the proximal ends of the first and second fingers in the locked position;

a cylindrical sleeve positioned within the housing, wherein the first and second fingers are positioned at least partially within the cylindrical sleeve, wherein the cylindrical sleeve extends between a first axial end and a second axial end, and wherein each of the first axial end and the second axial end of the cylindrical sleeve are positioned within and surrounded radially by the housing; and a pin extending radially through the cylindrical sleeve, the first finger, and the second finger, wherein the pin defines the shared axis.

2. The lock as claimed in claim 1, wherein, in the locked position, the follower engages the first and second fingers such that the distance between the first and second engagement surfaces is increased relative to the unlocked position.

3. The security apparatus of claim 1, wherein, in the unlocked position, the follower is disengaged from the first and second fingers.

4. The security apparatus of claim 1, wherein the housing defines a circular aperture, wherein the first and second fingers extend through the circular aperture such that the first and second engagement surfaces are positioned outside of the housing, the shared axis is positioned within the housing, and the proximal ends of the first and second fingers are positioned within the housing.

5. The security apparatus of claim 1, wherein the locking mechanism selectively prohibits the engagement mechanism from transitioning from the locked position to the unlocked position.

6. The security apparatus of claim 1, further comprising a cable mount coupled to the housing and configured to receive a flexible cable for securing the security apparatus to an immovable object.

7. The security apparatus of claim 1, wherein a longitudinal axis of the first finger extends from the first engagement surface to the proximal end of the first finger, and wherein the follower engages a surface of the proximal end of the first finger that extends substantially longitudinally.

8. The security apparatus of claim 7, wherein a longitudinal axis of the second finger extends from the second engagement surface to the proximal end of the second finger, and wherein the follower engages a surface of the proximal end of the second finger that extends substantially longitudinally.

9. The security apparatus of claim 8, wherein the follower includes a first wing that engages the surface of the proximal end of the first finger that extends substantially longitudinally and a second wing that engages the surface of the proximal end of the second finger that extends substantially longitudinally.

10. The security apparatus of claim 1, wherein the follower extends within the cylindrical sleeve to engage the proximal end of the first finger and the proximal end of the second finger in the locked position.

11. The security apparatus of claim 1, wherein the cylindrical sleeve, the pin, the first finger, and the second finger are collectively insertable into the housing.

12. The security apparatus of claim 1, wherein the follower is configured to move into engagement with the proximal end of the first finger and the proximal end of the second finger in response to a user input, and wherein the follower is configured to move out of engagement with the proximal end of the first finger and the proximal end of the second finger in response to a user input.

13. A security apparatus for a portable electronic device, the portable electronic device having an aperture, the security apparatus comprising:

a housing;

an engagement mechanism configured to secure the security apparatus to the portable electronic device in a locked position and configured to disengage the security apparatus from the portable electronic device in an unlocked position, the engagement mechanism including a first finger and a second finger that are coupled to the housing, the first finger rotatable about a rotational axis of the first finger, the second finger rotatable about a rotational axis of the second finger, wherein the first finger has a first engagement surface configured to extend into the aperture to engage the portable electronic device and a proximal end opposite to the first engagement surface, wherein the second finger has a second engagement surface configured to extend into the aperture to engage the portable electronic device and a proximal end opposite to the second engagement surface;

a locking mechanism arranged in the housing and including a follower configured to move into engagement with the proximal end of the first finger and the proximal end of the second finger to move the engagement mechanism from the unlocked position to the locked position, wherein the follower engages the proximal end of the first finger and the proximal end of the second finger in the locked position, the follower terminating at a location between the rotational axis of the first finger and the proximal end of the first finger in the locked position;

a cylindrical sleeve positioned within the housing, wherein the first and second fingers are positioned at least partially within the cylindrical sleeve, wherein the cylindrical sleeve extends between a first axial end and a second axial end, and wherein each of the first axial end and the second axial end of the cylindrical sleeve are positioned within and surrounded radially by the housing; and a pin extending radially through the cylindrical sleeve, the first finger, and the second finger, wherein the rotational axis of the first finger is coaxial with the rotational axis of the second finger, and wherein the pin defines the rotational axis of the first finger and the rotational axis of the second finger.

14. The security apparatus of claim 13, wherein the cylindrical sleeve, the pin, the first finger, and the second finger are collectively insertable into the housing.

15. A security apparatus for a portable electronic device, the portable electronic device having an aperture, the security apparatus comprising:
   a housing;
   an engagement mechanism configured to secure the security apparatus to the portable electronic device in a locked position and configured to disengage the security apparatus from the portable electronic device in an unlocked position, the engagement mechanism including a first finger and a second finger that are coupled to the housing, the first finger rotatable about a rotational axis of the first finger, the second finger rotatable about a rotational axis of the second finger, wherein the first finger has a first engagement surface configured to extend into the aperture to engage the portable electronic device and a proximal end opposite to the first engagement surface, wherein the second finger has a second engagement surface configured to extend into the aperture to engage the portable electronic device and a proximal end opposite to the second engagement surface;
   a locking mechanism arranged in the housing and including a follower configured to move into engagement with the proximal end of the first finger and the proximal end of the second finger to move the engagement mechanism from the unlocked position to the locked position, wherein the follower engages the proximal end of the first finger and the proximal end of the second finger in the locked position;
   a cylindrical sleeve positioned within the housing, wherein the first and second fingers are positioned at least partially within the cylindrical sleeve; and
   a pin extending radially through the cylindrical sleeve, the first finger, and the second finger, wherein the pin defines the shared axis,
   wherein a longitudinal axis of the first finger extends from the first engagement surface to the proximal end of the first finger, and wherein the follower engages a surface of the proximal end of the first finger that extends substantially longitudinally to move the engagement mechanism to the locked position.

16. The security apparatus of claim 15, wherein a longitudinal axis of the second finger extends from the second engagement surface to the proximal end of the second finger, and wherein the follower engages a surface of the proximal end of the second finger that extends substantially longitudinally to move the engagement mechanism to the locked position.

17. The security apparatus of claim 16, wherein the follower includes a first wing that engages the surface of the proximal end of the first finger that extends substantially longitudinally and a second wing that engages the surface of the proximal end of the second finger that extends substantially longitudinally.

* * * * *